United States Patent
Peddada et al.

(10) Patent No.: US 11,095,634 B2
(45) Date of Patent: Aug. 17, 2021

(54) USER AUTHENTICATION USING MULTI-PARTY COMPUTATION AND PUBLIC KEY CRYPTOGRAPHY

(71) Applicant: salesforce.com, inc., San Francisco, CA (US)

(72) Inventors: Prasad Peddada, Alameda, CA (US); Taher Elgamal, Atherton, CA (US)

(73) Assignee: salesforce.com, inc., San Francisco, CA (US)

( * ) Notice: Subject to any disclaimer, the term of this patent is extended or adjusted under 35 U.S.C. 154(b) by 311 days.

(21) Appl. No.: 16/263,871

(22) Filed: Jan. 31, 2019

(65) Prior Publication Data
US 2020/0252382 A1    Aug. 6, 2020

(51) Int. Cl.
*H04L 29/06* (2006.01)
*H04L 9/32* (2006.01)
*H04L 9/30* (2006.01)

(52) U.S. Cl.
CPC ........... *H04L 63/08* (2013.01); *H04L 9/30* (2013.01); *H04L 9/3271* (2013.01); *H04L 63/166* (2013.01)

(58) Field of Classification Search
CPC ..... H04L 63/08; H04L 63/166; H04L 9/3271; H04L 9/30; H04L 9/3255; H04L 9/085; H04L 2209/46
See application file for complete search history.

(56) References Cited

U.S. PATENT DOCUMENTS

| 2008/0229104 A1* | 9/2008 | Ju | H04L 9/3273 |
| | | | 713/169 |
| 2012/0019379 A1* | 1/2012 | Ben Ayed | G06F 21/32 |
| | | | 340/539.1 |
| 2018/0212762 A1 | 7/2018 | Peddada et al. | |
| 2018/0212785 A1 | 7/2018 | Peddada et al. | |

OTHER PUBLICATIONS

David W. Archer, et al., "From Keys to Databases—Real-World Applications of Secure Multi-Party Computation," article in The Computer Journal 61(12):1749-1771, Dec. 2018, 32 pages.
Nigel P. Smart, "Multi Party Computation: From Theory to Practice," Department of Computer Science, University of Bristol, Merchant Venturers Building, Jan. 8, 2013, 28 pages.

* cited by examiner

*Primary Examiner* — Huan V Doan
(74) *Attorney, Agent, or Firm* — Kowert, Hood, Munyon, Rankin & Goetzel, P.C.

(57) ABSTRACT

Techniques are disclosed relating to user authentication using multi-party computation and public key cryptography. In some embodiments, a client system may receive, from a server system, an authentication challenge that includes a first partial signature value. The client system may access key-pair information that includes, for a server key-pair, a server public key and a second component of a server private key, where the server system has access to a first component of the server private key. The client system may then generate a second partial signature value using the second component of the server private key but not an entirety of the server private key, and may generate a final signature value based on the first and second partial signature values. Using the final signature value, the client system may then determine whether the authentication challenge was sent by the server system.

20 Claims, 11 Drawing Sheets

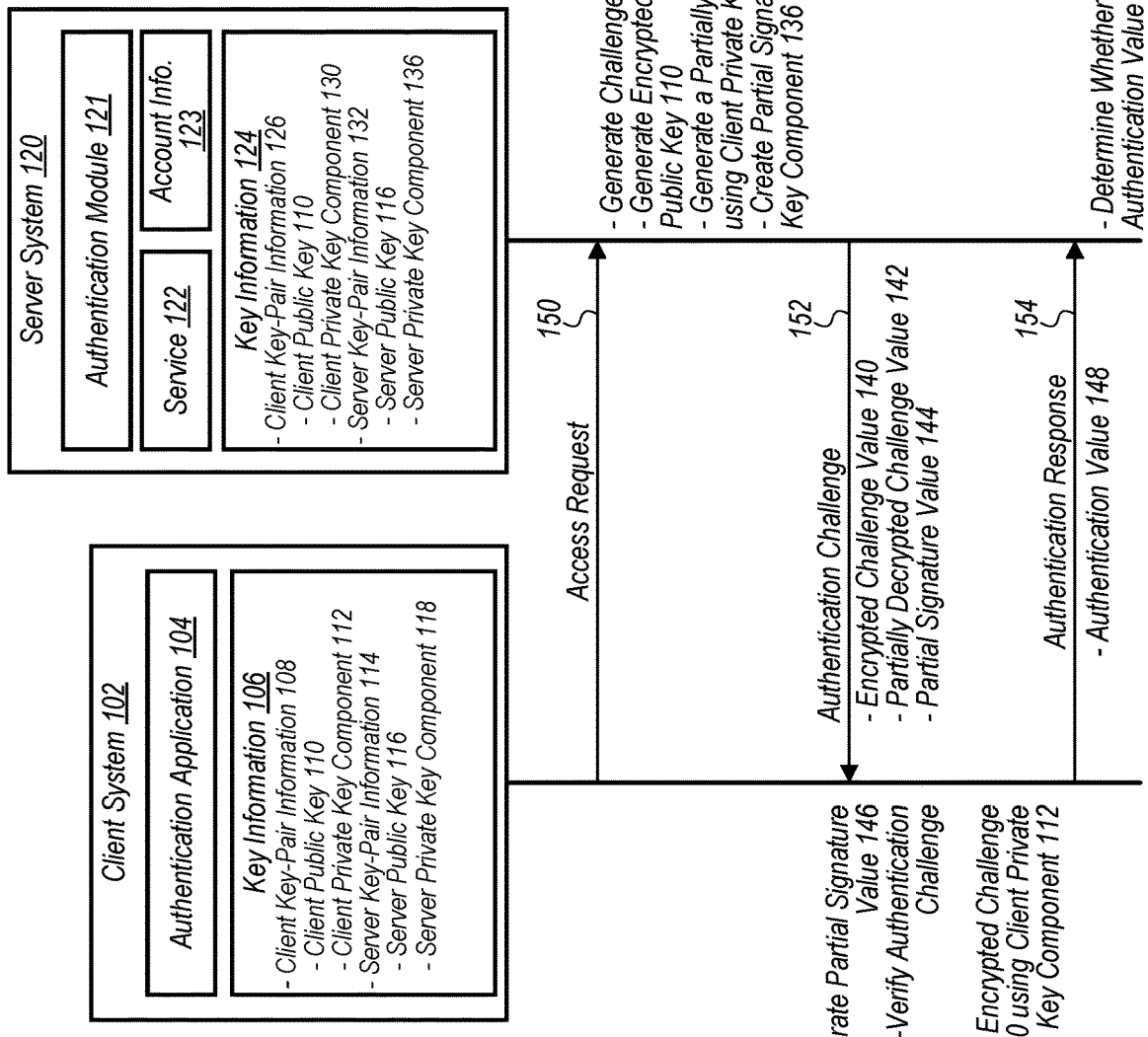

230

```
KeyPairGenerator gen = KeyPairGenerator.getInstance("RSA");
gen.initialize(4096);
KeyPair pair = gen.generateKeyPair();
RSAPrivateKey privateKey = (RSAPrivateKey) pair.getPrivate();
RSAPublicKey publicKey = (RSAPublicKey) pair.getPublic();
BigInteger modulus = privateKey.getModulus();
BigInteger publicExponent = publicKey.getPublicExponent();
BigInteger privateExponent = privateKey.getPrivateExponent();
```

```
private static BigInteger splitComponent(BigInteger modulus, BigInteger value, SecureRandom random)
{
  BigInteger splitValue = new BigInteger(modulus.bitLength(), random);
  while (splitValue.compareTo(value) >= 0 || splitValue.equals(ZERO)) {
    splitValue = new BigInteger(modulus.bitLength(), random);
  }
  return splitValue;
}
```

```
BigInteger serverComponent = splitComponent(modulus, privateExponent, random);
BigInteger clientComponent = privateExponent.subtract(serverComponent).subtract(pin);
```

```
MessageDigest digest = MessageDigest.getInstance("SHA-512");
ByteBuffer buf = ByteBuffer.allocate(8);
buf.putLong(System.currentTimeMillis());
byte[] digestValue = encodeDigest(digest.digest(buf.array()));
```

```
BigInteger serverPartialSignature = new BigInteger(digestValue).modPow(serverComponent, modulus);
```

```
BigInteger PINPartialSignature = new BigInteger(digestValue).modPow(pin, modulus);
BigInteger mobilePartialSignature = new BigInteger(digestValue).modPow(mobileComponent, modulus);
```

```
BigInteger sigValue =
serverPartialSignature.multiply(PINPartialSignature).mod(modulus).multiply(mobilePartialSignature).mod(modulus);
```

```
BigInteger verValue = sigValue.modPow(publicExponent, publicKey.getModulus());
```

FIG. 5E

USER AUTHENTICATION USING MULTI-PARTY COMPUTATION AND PUBLIC KEY CRYPTOGRAPHY

RELATED APPLICATIONS

The present application is related to U.S. application Ser. No. 15/415,451 entitled "Secure Remote User Authentication Leveraging Public Key Cryptography and Key Splitting," filed on Jan. 25, 2017, and U.S. application Ser. No. 15/476,833 entitled "Secure Internal User Authentication Leveraging Public Key Cryptography and Key Splitting," filed on Mar. 31, 2017.

BACKGROUND

Technical Field

This disclosure relates generally to data security, and more particularly to performing message verification using key-splitting and public key cryptography.

Description of the Related Art

Server computer systems, such as web servers, application servers, email servers, etc., may provide various computing resources and services to an end user. For example, a web service may use a computer system to provide access to software applications to remote users via a network. A web service will commonly limit access to its resources and services to only those users with a valid user account with the service. One method for limiting access to a web service is to require an end user to establish a user account and authentication credentials (e.g., a username and password), and to require end users to provide valid authentication credentials prior to gaining access to the service.

In some instances, however, such user credentials may be discovered by a malicious third-party (e.g., through a phishing attack, brute-force attack, etc.), presenting security concerns for server systems that rely solely on such credentials for user authentication. For example, once a malicious third-party obtains a valid user's authentication credentials, the malicious third-party may access the web service to the same extent as the authorized user.

BRIEF DESCRIPTION OF THE DRAWINGS

FIG. 1 is a communication diagram illustrating an example exchange between a server system and a client system to determine whether to verify a message using key-splitting and public key cryptography, according to some embodiments.

FIGS. 2C-2E show example code snippets that may be used to implement various aspects of the operations described with reference to FIGS. 2A-2B, according to some embodiments.

FIGS. 5A-5E depict code snippets that may be used to implement various operations described with reference to FIGS. 3 and 4A-4B, according to some embodiments.

DETAILED DESCRIPTION

Figure 2A:
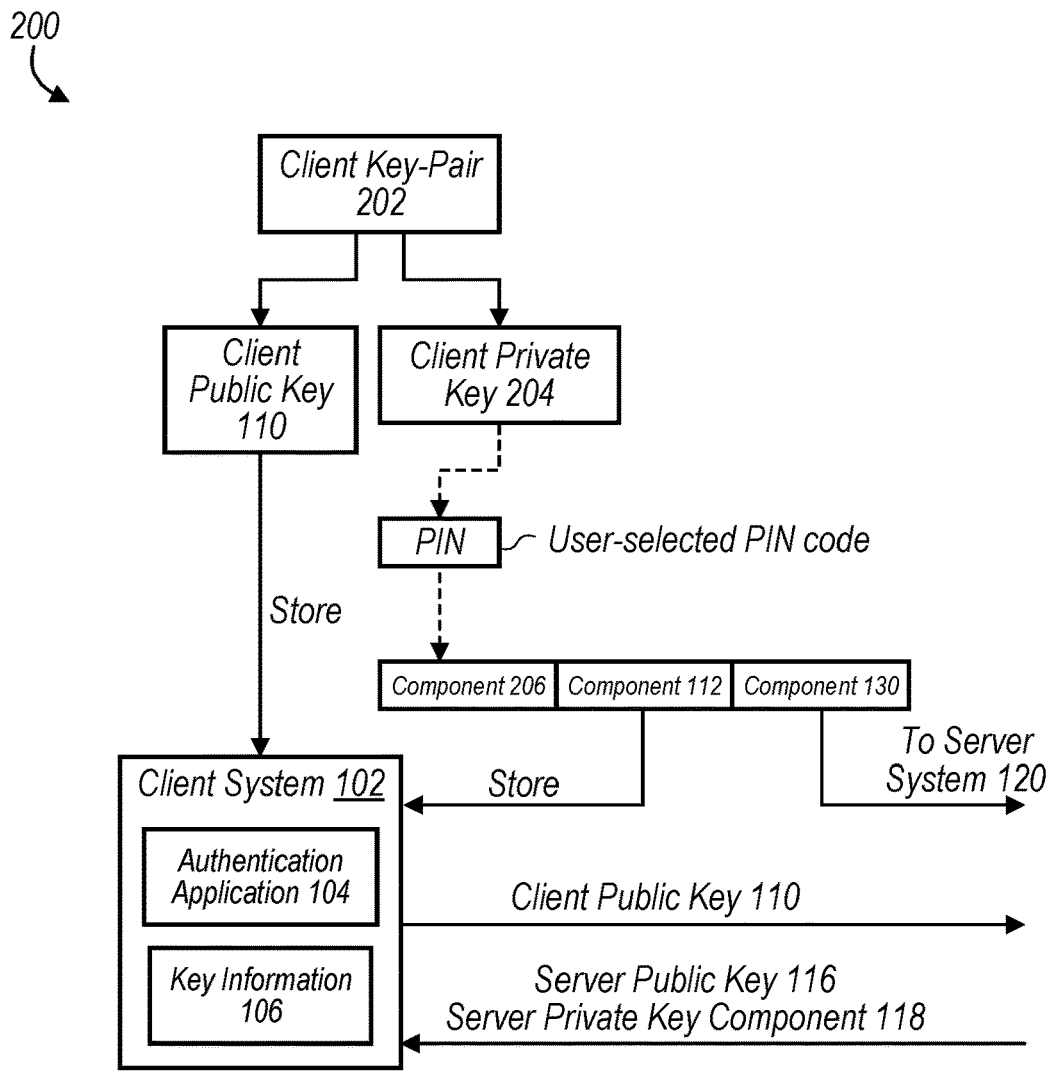
FIGS. 2A-2B depict block diagrams respectively illustrating operations performed by a client system and a server system to generate and exchange the key-pair information, according to some embodiments.

Server systems implement various user authentication techniques in an effort to limit unauthorized access to computing services. As noted above, one common technique is to require a requesting user to provide authentication credentials (such as a password, PIN code, etc.) that may be validated (e.g., by the server system or a separate authentication server system) prior to providing the user with access to the service. This authentication technique presents various security concerns.

For example, with the proliferation of web-based services and mobile devices, a given user is often required to establish an account—and corresponding authentication credentials—for numerous websites or services. Since they are required to remember numerous authentication credentials, it is common for people to use authentication credentials that are easy to remember (e.g., "password," "12345," etc.) or to use the same authentication credentials across multiple services. Both of these common practices present significant security risks.

For example, simple credentials that are easy to remember are particularly susceptible to discovery through a brute-force, password-guessing attack. To mitigate the risk of such brute-force attacks, some web services enforce policies specifying minimum requirements for a user's authentication credentials, such as their length (e.g., at least eight characters) or content (e.g., use of an uppercase letter, number, special character, etc.). Unfortunately, however, such policies typically only make authentication credentials marginally more secure against brute-force attacks while making them significantly more difficult for users to remember, further increasing the likelihood that people will reuse credentials across multiple web services. As noted above, using the same authentication credentials across multiple websites or services may increase the risk that the credentials are compromised by a malicious third-party. For example, if the user's credentials are compromised on a server for any one of the web services, all of the services would be susceptible to unauthorized access by a malicious third-party.

To help address these shortcomings, many web services implement multi-factor authentication ("MFA") systems in which, in addition to providing something a user knows (e.g., an authentication credential) the requesting user must also provide one or more additional authentication factors, such as something the user "has" (e.g., a physical token, access to a linked email account or mobile device, etc.) or something the user "is" (e.g., by providing a biometric reading, etc.), to further prove their identity. While MFA systems can offer greater security than authentication credentials alone, such systems still suffer from various security concerns. For example, in many such MFA systems, the server still stores sensitive information, such as authentication credentials (either in plaintext or as a hash value), that may be susceptible to discovery by a malicious user. If a malicious third-party is able to obtain a valid user's authentication credentials and satisfy an additional authentication factor (e.g., through SIM card swapping, accessing the valid user's email account, etc.), the malicious third-party may be able to circumvent the MFA system. Further, in some instances, a user's authentication credentials (or other sensitive authentication information) may be vulnerable to discovery as they are sent between the server and client systems, even if MFA techniques are being used. For example, a malicious user may use a man-in-the-middle attack to intercept authentication information as it is sent between the server and client systems and use that authentication information to gain unauthorized access to the web service posing as the valid user. Accordingly, many authentication systems require a secure underlying connection (e.g., using Transport Layer Security ("TLS") or any of various other security protocols) between the server and client systems before authentication operations may be safely performed.

In various embodiments, the disclosed systems and methods may ameliorate these and other technical problems by enabling message verification using key-splitting and public key cryptography to achieve multi party computation security capabilities. The disclosed systems and methods may be used by a first computer system, e.g., by a client system, to verify that a message it receives was actually sent by a second computer system (e.g., the server system that the client is attempting to access). In various embodiments, as described in more detail below, the server and client systems may establish an asymmetric key-pair (e.g., based on RSA, ElGamal, or any other suitable asymmetric key encryption scheme) and split the private key into multiple parts or "components." (As used herein, splitting a key into "components" refers to the process of decomposing the key value into multiple addends that, when summed, add up to the entire key. In various embodiments, each such addend may be referred to as a "component" of the key.) In various embodiments, some—but not all—of the components are stored at the server system and some—but not all—of the components are stored at the client system such that no one entity has access to the entire private key. By not storing the entire private key at any one location, the risk of discovery of the private key by a malicious third-party is greatly reduced. In various embodiments, both the server and the client may use their respective components of the private key to independently generate signature values (e.g., based on some message or value, such as a digest value). These "partial" signature values (generated by the client and server systems) may then be combined to create a "final" signature value, which may be the same value as a signature value generated based on the entire private key.

For example, the server may generate its partial signature value based on the server's component of the private key and a digest value. The server may then send this partial signature value (along with other information, if desired) in a message to the client system. The client system may independently generate a partial signature value based on the client's component of the private key and the same digest value. The client system may then use these partial signature values to generate the final signature value, as explained below. This final signature value, in turn, may be used (along with the public key from the asymmetric key pair) to recover the original digest value on which the partial signature values were based. If the recovered digest value matches the original digest value, the client system may verify that the message it received originated from the server system.

Accordingly, in various embodiments, the disclosed systems and methods allow the client system to verify that a message is actually from a server system that it is attempting to access, rather than a malicious third-party (e.g., implementing a man-in-the-middle attack). This, in turn, may allow the client and server systems to securely perform authentication operations without reliance on a secure connection (e.g., using TLS) between the two systems, improving the security of the authentication process. Further, in instances in which the client and server systems are able to communicate over a secure connection, the disclosed systems and methods may still be used to increase security and provide further confidence in the authentication process, in some embodiments. Thus, in various embodiments, the disclosed systems and methods may improve data security for both a web service and its users, thereby improving the functioning of the service as a whole.

Figure 4A:
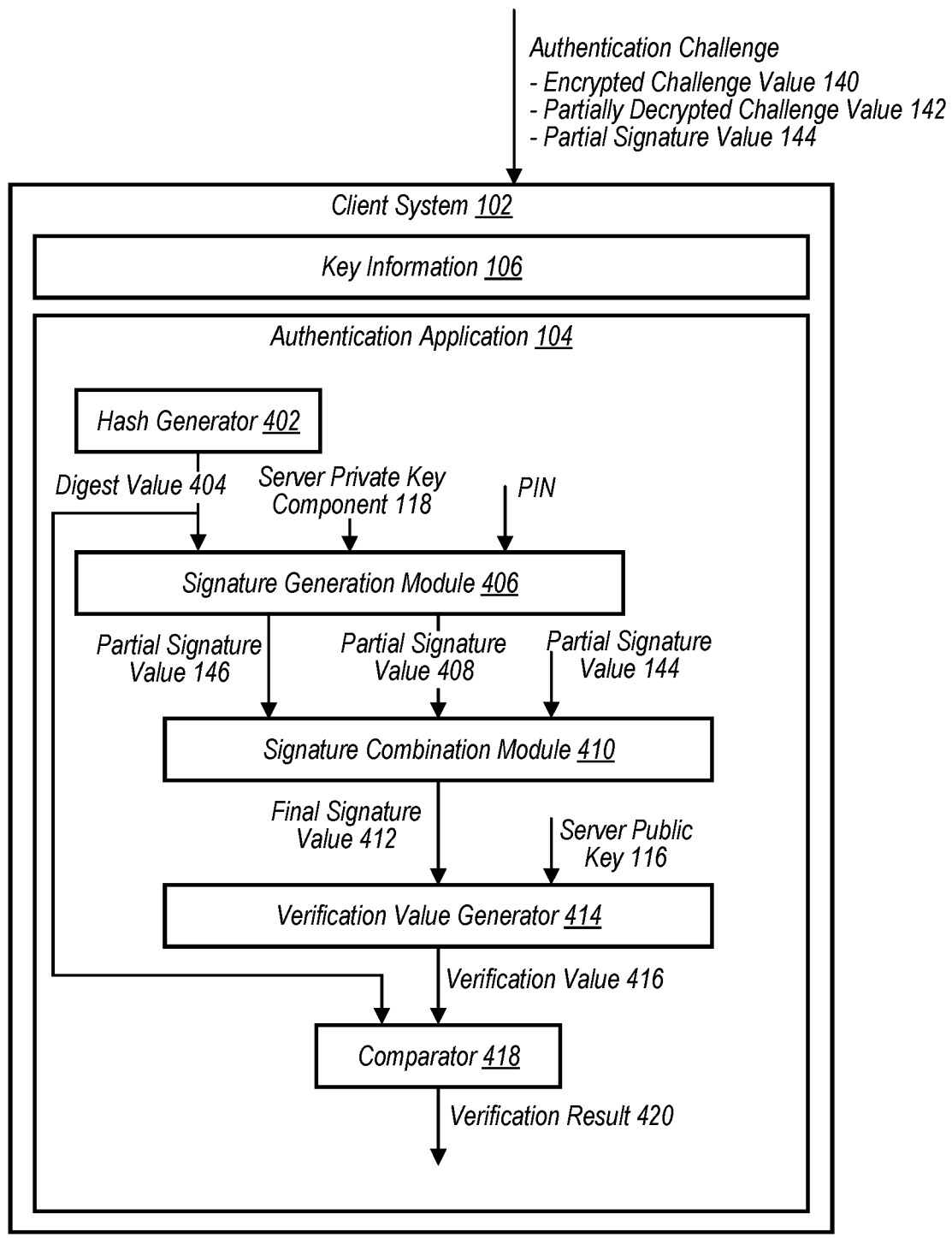
FIGS. 4A-4B are block diagrams illustrating an example embodiment of a client system and an authentication application, according to some embodiments.

Note that the terms "partial signature value" and "final signature" are used as labels to facilitate discussion and to denote that a final signature value (e.g., final signature value 412 of FIG. 4A) is generated subsequent to, and based on, two or more partial signature values (e.g., partial signature values 144, 146, and 408 of FIG. 4A). The terms "partial signature value" and "final signature value" are not intended to limit the present disclosure to embodiments in which such values are the first and last signature values generated by the client or server systems. For example, in some embodiments, the server system 120 may create some other signature value (e.g., as part of some other authentication process) before generating partial signature value 144, and the client system 102 may generate some other signature value (e.g., as part of some other authentication process) after generating the final signature value 412.

Referring now to FIG. 1, a communication diagram illustrating an exchange 100 for user authentication using multi-party computation and public key cryptography is shown, according to some embodiments. In the depicted embodiment, FIG. 1 includes client system 102 and server system 120. Note that, although shown in direct connection, client system 102 and server system 120 may be connected via one or more communication networks (not shown for clarity). Note that, in various embodiments, client system 102 and server system 120 may communicate over either a secure or unsecured connection.

In various embodiments, server system 120 may host a web service 122 accessible to various remote users via one or more communication networks. For example, server system 120 may host an email service, streaming media service, customer-relationship management ("CRM") software applications or data, or any other web service 122, according to various embodiments. In some embodiments, for example, server system 120 may be (or be included in) a multi-tenant computer system or database system that provides computing resources for a plurality of tenants, each of which may include any suitable number of users. In the depicted embodiment, a user of client system 102 sends, at communication 150, a request to access the service 122 provided by server system 120. As discussed in more detail below, server system 120 may require the client system 102 to perform various authentication operations prior to gaining access to the service 122.

In the depicted embodiment, server system 120 includes (or has access to) account information 123 associated with various user accounts for web service 122. This account information 123 may include various items of information associated with the user accounts of the service 122, such as authentication credentials, access permissions, etc. Server system 120 further includes authentication module 121, which, in various embodiments, is operable to determine whether to authenticate a requesting user of client system 102 to the web service 122. In various embodiments, authentication module 121 uses account information 123 and key information 124 in making this determination.

In various embodiments, key information 124 (which may be included as part of account information 123, in some embodiments) includes information corresponding to one or more asymmetric key-pairs associated with various user accounts for the service 122. The process of generating and exchanging key-pair information 124 between client system 102 and server system 120 will be discussed in more detail below with reference to FIGS. 2A-2B. For the purposes of FIG. 1, note that key information 124 includes client key-pair information 126 and server key-pair information 132 associated with the user of client system 102, which correspond to two separate asymmetric key-pairs generated during an enrollment phase. That is, in various embodiments, a client key-pair includes both a client public key and a client private key, and a server key-pair includes both a server public key and a server private key. As noted above and described in more detail below, both the client private key and the server private key may be "split" into two or more components and distributed between the client system 102 and the server system 120 (and, optionally, a user of client system 102) such that no one entity has access to the entire client private key or server private key. In the depicted embodiment, key information 124 includes client key-pair information 126 and server key-pair information 132. Similarly, client system 102 has (or has access to) key information 106, which includes client key-pair information 108 and server key-pair information 114. In various embodiments, client key-pair information 108 (at the client system 102) and 126 (at the server system 120) correspond to the same client key-pair generated during the enrollment phase, and the server key-pair information 114 (at the client system 102) and 132 (at the server system 120) correspond to the same server key-pair generated during the enrollment phase. As shown in FIG. 1, while both the client 102 and the server 120 may store the client public key 110 and server public key 116, neither the client 102 nor the server 120 store the entire client private key or server private key, further protecting these key values in the event that either entity is compromised by a malicious third-party.

The client key-pair and server key-pair may be generated using any of various suitable public key encryption algorithms or schemes. For example, in various embodiments described throughout the present disclosure, the RSA algorithm is used to generate the client and server key-pairs. Note, however, that this embodiment is provided merely as an example and, in other embodiments, any other suitable public key encryption schemes, such as the ElGamal encryption system, may be used. Further note that, in some embodiments, the same public key encryption algorithm need not be used for both the client key-pair and server key-pair. As one non-limiting example, the RSA algorithm may be used to generate the server key-pair while the ElGamal system may be used to generate the client key-pair. (Although these two key-pairs are referred to as "client" and "server" key-pairs, these terms are used for convenience to facilitate discussion. As discussed in more detail below, the client and server key-pairs may both be generated by one entity (e.g., both generated by the client system 102 or the server system 120) or each entity may create a separate key-pair, according to various embodiments.)

Once the server system 120 receives the access request at 150, it may generate various items of authentication and verification information to be sent to the client system 102. For example, in the depicted embodiment, server system 120 generates a challenge value 138, which may be a random or pseudo-random numeric or alphanumeric value generated using any suitable algorithm or cryptographic hash function. The server system 120 may then encrypt the challenge value 138 using the client public key 110 to generate encrypted challenge value 140. The server system 120 may then generate a partially decrypted challenge value 142 (based on the encrypted challenge value 140) using client private key component 130. As will be described in more detail below with reference to FIG. 3, as used herein, a "partially decrypted" challenge value refers to a challenge value that has been encrypted using a public key and then, using a component of the corresponding private key, decrypted. The resulting value may be referred to as a "partially decrypted challenge value." This same process may be repeated using the remaining components of the private key such that when all of the partially decrypted challenge values are combined, the completely decrypted challenge value may be recovered.

As described in more detail below with reference to FIG. 4B, the encrypted challenge value 140 and partially decrypted challenge value 142 may be used by the client system 102 to generate an authentication value 148, which may then be sent back to the server system 120 and used to determine whether to authenticate the user to the service 122. The server system 120 may also generate information to be used, by the client system 102, to verify that the authentication challenge was actually sent by the server system 120. For example, in the depicted embodiment, the server system 120 generates a partial signature value 144 using the server private key component 136. In various embodiments, partial signature value 144 may be a digital signature (e.g., an RSA signature, ElGamal signature, etc.) created by authentication module 121 based on a particular message. In some embodiments, for example, authentication module 121 may generate a digest value (e.g., using SHA-256, MD-5, etc.) based on an input value (e.g., encrypted challenge value 140, a current time, a counter, etc.). A more detailed discussion of server system 120 is provided below with reference to FIG. 3.

At 152, the server system 120 sends an authentication challenge to the client system 102, which, in the depicted embodiment, includes the encrypted challenge value 140, the partially decrypted challenge value 142, and the partial signature value 144. In various embodiments, authentication application 104 (included on client system 102) may use these values to both verify that the authentication challenge originated at the server system 120 and to generate an authentication value 148 that may be used, by the server system 120, to determine whether to authenticate the user to the service 122. For example, client system 102 may generate a partial signature value 146 using its server private key component 118. In various embodiments, partial signature value 146 may be a digital signature (e.g., an RSA signature, ElGamal signature, etc.) created by authentication application 104 based on a particular message. In various embodiments, the particular message is generated in the same manner by both the client system 102 and the server system 120 (e.g., a digest value generated using the same hash function and the same input value). Further, in various embodiments, partial signature values 144 and 146 are generated using the same digital signature schemes (e.g., both using RSA, ElGamal, etc.).

In various embodiments, authentication application 104 may combine the partial signature values 144 and 146 to generate a final signature value. In the depicted embodiment in which the server private key has been split into two components (that is, components 118 and 136), the two partial signature values 144 and 146 may be combined in a manner that produces a final signature value that is the same as a signature value generated based on the entire server private key. As described in more detail below with reference to FIG. 4A, authentication application 104 may use this final signature value, along with the server public key 116, to verify that the authentication challenge originated at the server system 120 (and not, for example, a malicious third-party posing as the server system). Note that FIG. 1 has been described with reference to an embodiment in which the server private key has been split into only two components. In other embodiments, however, the server private key may be split into any suitable number of components. For example, in some embodiments, the server private key may be split into three components—component 118, component 136, and a third component that may be provided by the user. In some such embodiments, for example, the third component may be a relatively short piece (e.g., a 4-6 digit portion that could be considered a personal identification number or "PIN") of the server private key that the user provides on the client system 102 at the time of authentication.

Once it has verified the authentication challenge, client system 102 may use the client key-pair information 108 to decrypt the encrypted challenge value 140 and generate an authentication value 148. Various embodiments of client system 102, including the manner in which it decrypts encrypted challenge value 140, are described in more detail below with reference to FIG. 4B. For the purposes of FIG. 1, note that the authentication application 104 may use the encrypted challenge value 140, the partially decrypted challenge value 142, and the client private key component 112 to recover the challenge value 138. The authentication application 104 may then generate an authentication value 148 based on this recovered challenge value (e.g., using a cryptographic hash function, such as SHA-256, MD5, etc.), or it may send the challenge value 138 to the server system 120 as the authentication value 148 itself.

In various embodiments, server system 120 may determine whether to authenticate the user of client system 102 to the service 122 based on the authentication value 148. For example, in embodiments in which the authentication value 148 is a digest value based on the recovered challenge value, the server system 120 may similarly generate a digest value (e.g., using the same hash function) based on the challenge value 138 and compare. If the two values match, the server system 120 may authenticate the user and allow the user to access the service 122. If, however, the two values do not match, the server system 120 may take one or more corrective actions, such as denying the user access to the service 122, initiating additional authentication operations, etc.

Note that, in various embodiments, the disclosed systems and methods may be thought of as a form of multi-party computation ("MPC") in which multiple parties jointly compute a function using their respective input values without revealing information about those input values. As one non-limiting example, as discussed above, server system 120 may generate a partial signature value 144 using the server private key component 136 and send partial signature value 144 to the client system 102. The client system 102 may then generate its own partial signature value 146 using its server private key component 118, and combine the partial signature values 144 and 146 to generate a final signature value. In doing so, both the server system 120 and the client system 102 contributed to the computation of the final signature value without revealing their respective server private key components. Accordingly, the server system 120 and client system 102 (and, in some embodiments, the user of client system 102) may be considered the "parties" in such a MPC system.

Figure 2B:
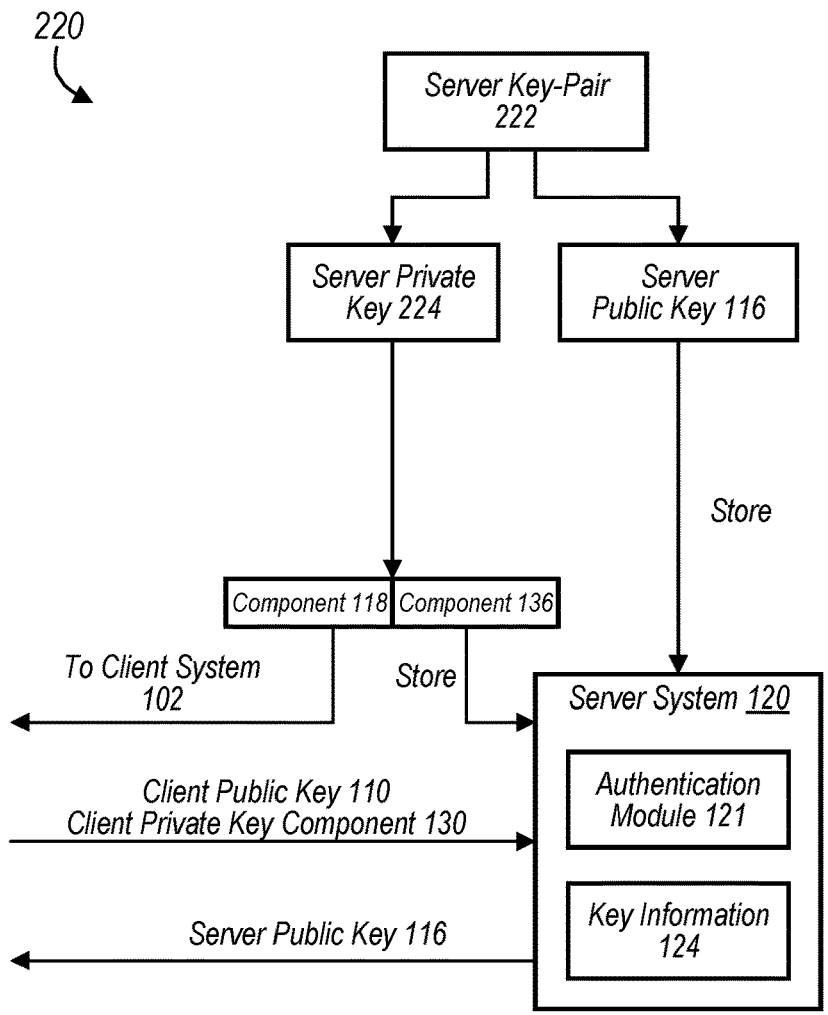

The following discussion, with reference to FIGS. 2A-2E, describes example embodiments in which client system 102 and server system 120 generate and exchange key-pair information for a server key-pair and a client key-pair during an enrollment operation (in which a user of client system 102 enrolls in an authentication service provided by the server system 120). More specifically, FIGS. 2A-2B depict block diagrams respectively illustrating operations performed by the client system 102 and the server system 120 to generate and exchange the key-pair information. FIGS. 2C-2E show example code snippets, provided in JAVA™, which may be used to implement various aspects of the operations described with reference to FIGS. 2A-2B.

Turning now to FIG. 2A, a block diagram 200 is depicted illustrating operations performed by the client system 102 (e.g., by the authentication application 104) to generate and exchange the client key-pair information with server system 120. In the depicted embodiment, client system 102 generates a client key-pair 202, including client public key 110 and client private key 204. As noted above, client key-pair 202 may be generated using any of various suitable asymmetric key encryption algorithms. For example, in FIG. 2C, code snippet 230 shows an example in which an asymmetric key-pair is generated using the RSA algorithm with keys 4096 bits in length. In the depicted embodiment, client system 102 stores the client public key 110 in key information 106 (although, in other embodiments, client system 102 may not store the client public key 110 at all, or may publish it to be stored remotely and retrieved as-needed).

In FIG. 2A, client system 102 splits the client private key 204 into multiple components. Note that, in various embodiments, when splitting the client private key 204 into components, the components may be selected such that, when all of the components are added together, their sum is equal to the original client private key 204. As a simplified example, if the client private key 204 is the number 7, it could be split into three components such that the first component is 4, the second component is 2, and the third component is 1. In the depicted embodiment, client system 102 splits the client private key 204 into three components—the first component is a PIN code selected by the user (e.g., 4-6 digits in length) and the second and third components (components 112 and 130) are based on the client private key 204 and the PIN code such that the sum of the PIN, component 112, and component 130 is equal to the client private key 204. Code snippet 240 and 250, in FIGS. 2D-2E, show an example implementation to split the client private key 204 into three such components.

Client system 102 may then store the client private key component 112 in key information 106, while sending the client public key 110 and the client private key component 130 to the server system 120. Note that, in various embodiments, the client system 102 does not store at least one of the client private key components such that it does not store the entirety of the client private key 204. For example, in the depicted embodiment, client system 102 stores the client private key component 112 but does not store the client private key component 130 or the PIN (which the user may provide at the time of authentication). As shown in FIG. 2A, the client system 102 receives the server public key 116 and server private key component 118, from the server system 120, which it may store in key information 106.

In FIG. 2B, a block diagram 220 is depicted illustrating operations performed by the server system 120 (e.g., by authentication module 121) to generate and exchange server key-pair information with client system 102. Note that, in the embodiment depicted in FIGS. 2A-2B, client system 102 generates the client key-pair 202 and the server system 120 generates the server key-pair 222. This embodiment is provided merely as an example and, in other embodiments, either the client system 102 or the server system 120 may generate both the client and server key-pairs, as desired.

In the depicted embodiment, server system 120 generates a server key-pair 222, including server public key 116 and server private key 224. As with client key-pair 202, server key-pair 222 may be generated using any of various suitable asymmetric key encryption algorithms. In some embodiments, server key-pair 222 may be generated as illustrated in the code snippet 230 of FIG. 2C. In the depicted embodiment, server system 120 stores the server public key 116 in key information 124.

In various embodiments, server system 120 splits the server private key 224 into multiple components. As with the client private key 204, server private key 224 may be split into components selected such that the sum of all of the components is equal to the entire server private key 224. For example, in the depicted embodiment, server private key 224 is split into two components, component 118 and component 136. Further, in the depicted embodiment, the server system 120 sends the server private key component 118 and the server public key 116 to the client system 102, while storing the server private key component 136. Note that, in various embodiments, the server system 120 does not store at least one of the server private key components such that it does not store the entirety of the server private key 224. For example, in the depicted embodiment, server system 120 stores the server private key component 136 but does not store the server private key component 118. As shown in FIG. 2B, the server system 120 receives the client public key 110 and client private key component 130, from the client system 102, which it may store in key information 124.

Note that, in some embodiments, server private key 224 may be split into a greater number of components. For example, similar to the client private key 204, server private key 224 may be split into three components, in some embodiments, with the first component being a PIN code (e.g., to be provided by the user, on the client system 102, at the time of authentication and sent to the server system 120) and the second and third components may be generated based on the server private key 224 and that PIN code. In some such embodiments, the PIN used as a component of the server private key 224 may be the same as or different than the PIN used as a component of the client private key 204.

Figure 3:
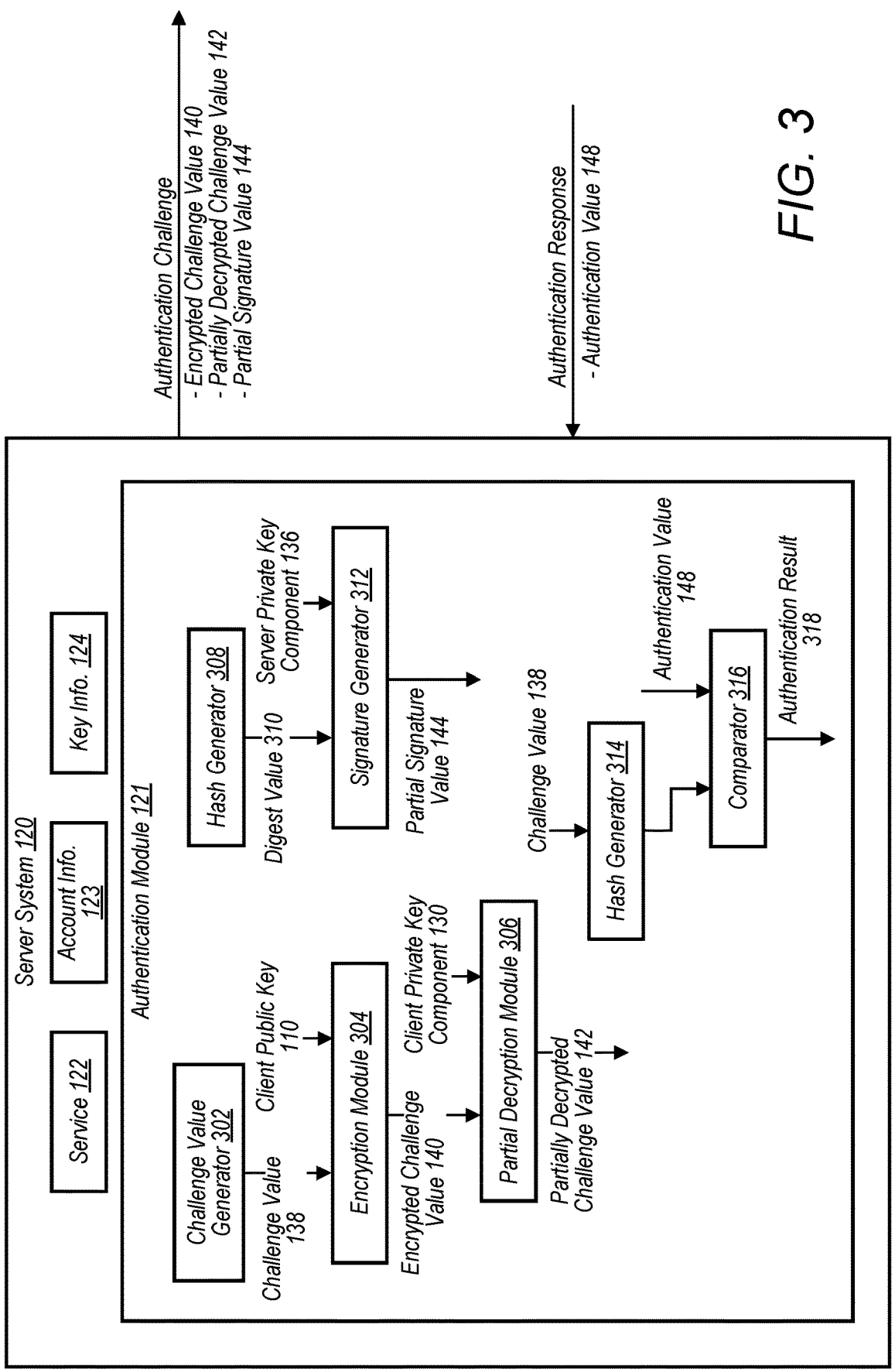
FIG. 3 is a block diagram illustrating a server system and authentication module, according to some embodiments.

Referring now to FIG. 3, a block diagram illustrating an example embodiment of a server system 120 and authentication module 121 is shown. In various embodiments, authentication module 121 is operable to determine whether to authenticate a requesting user of client system 102 to the service 122. For example, as discussed above, authentication module may be operable to generate challenge information—such as encrypted challenge value 140 and partially decrypted challenge value 142—to be sent to the client system 102. Server system 120 may then receive an authentication response, from client system 102, that includes authentication value 148, which the authentication module 121 may use to determine whether to authenticate the user to the service 122. Note that in the following description of FIGS. 3 and 4A-4B, reference will be made to the code snippets 500-540 shown in FIGS. 5A-5E, which may be used to implement various operations described with reference to FIGS. 3 and 4A-4B.

In the depicted embodiment, authentication module 121 includes challenge value generator 302, which is operable to generate a challenge value 138, according to various embodiments. Challenge value 138, in various embodiments, may be a random or pseudo-random value generated using any suitable random or pseudo-random function. Authentication module 121 further includes encryption module 304, which is operable to encrypt challenge value 138 to generate encrypted challenge value 140. In various embodiments, encryption module 304 may use the RSA encryption algorithm to generate encrypted challenge value 140 by encrypting the challenge value 138 using the client public key 110. In other embodiments, however, other suitable public key encryption systems may be used, such as the ElGamal encryption system.

Authentication module 121 further includes partial decryption module 306, which is operable to generate a partially decrypted challenge value 142, according to various embodiments. In some embodiments, for example, partial decryption module 306 may generate value 142 by decrypting the encrypted challenge value 140 using the client private key component 130 (e.g., using the RSA encryption algorithm or any other suitable public key encryption algorithm).

Further, in the depicted embodiment, authentication module 121 includes hash generator 308, which is operable to generate a digest value 310 (which may also be referred to as a hash value 310) based on an input value, such as encrypted challenge value 140, a current time, a counter, etc. In various embodiments, hash generator 308 may use any suitable hash function, such as SHA-256, MD5, etc. For example, code snippet 500 of FIG. 5A shows an example implementation in which a digest value 310 is generated using SHA-512 based on a current time. Note, however, that this embodiment is provided merely as an example and is not intended to limit the scope of the present disclosure. In other embodiments, for example, hash generator 308 generates digest value 310 based on encrypted challenge value 140. In FIG. 3, authentication module 121 also includes signature generator 312, which is operable to generate a partial signature value 144 based on the digest value 310. In some embodiments, partial signature value 144 may be a digital signature (e.g., an RSA signature value, an ElGamal signature value, etc.) generated based on the digest value 310 using the server private key component 136. For example, in some embodiments, signature generator 312 may generate an RSA partial signature value 144 as follows:

$$PS_{144} = (dv_{310})^{Component\ 136} \pmod{n} \tag{1}$$

Where $PS_{144}$ is the partial signature value 144, $dv_{310}$ is the digest value 310, Component 136 is the server private key component 136, and n is the modulus for the server key-pair. Code snippet 510 of FIG. 5B provides one example implementation that may be used to generate partial signature value 144.

In various embodiments, server system 120 may send an authentication challenge to client system 102 in response to the access request. This authentication challenge may include, in various embodiments, the encrypted challenge value 140, the partially decrypted challenge value 142, and the partial signature value 144. As described below with reference to FIGS. 4A and 4B, client system 102 may use the information in the authentication challenge to verify its sender and generate authentication value 148. Once server system 120 receives the authentication response, including the authentication value 148, authentication module 121 may determine whether to authenticate the user of client system 102 to the service 122. For example, as provided below, client system 102 may perform operations to recover the challenge value 138, which it may use to generate an authentication value 148. In the depicted embodiment, for example, authentication value 148 may be a hash value generated based on the recovered challenge value 138. In some such embodiments, authentication module 121 may verify the authentication value 148 by generating a hash value (using hash generator 314) of the original challenge value 138 and comparing that to the authentication value 148. If the two values match, the server system 120 may authenticate the user and allow the user to access the service 122. If, however, the two values do not match, the server system 120 may take one or more corrective actions, such as denying the user access to the service 122, initiating additional authentication operations, etc. Note that, in various embodiments, the authentication value 148 may simply be one of multiple factors used by the server system 120 in determining whether to authenticate a requesting user of client system 102 to the service 122. In some embodiments, for example, server system 120 may further consider the geographic location of the client system 102, whether a user is already logged into the user account, a number of login attempts, the amount of time between the authentication challenge and the authentication response, etc. when determining whether to authenticate a requesting user.

Figure 4B:
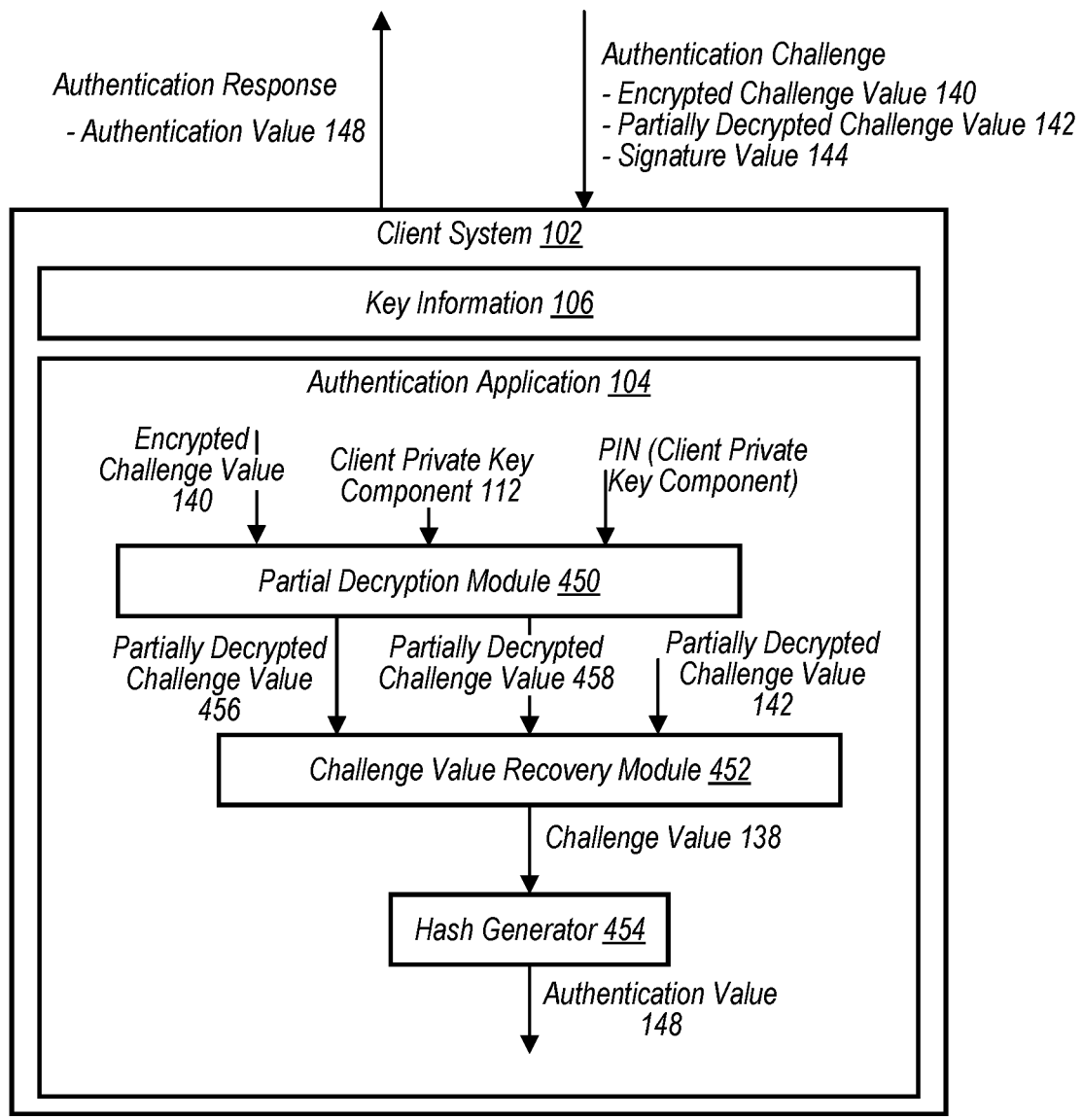

Turning now to FIGS. 4A and 4B, block diagrams illustrating an example embodiment of client system 102 and authentication application 104 are shown. More specifically, FIG. 4A depicts an embodiment in which authentication application 104 verifies that an authentication challenge was sent by the server system 120, and FIG. 4B depicts an embodiment in which the authentication application 104 generates an authentication value that may be sent to server system 120 and used to authenticate the user to the service. Note that, in some embodiments, authentication application 104 may be a software application associated with the service 122 such that, in addition to the various authentication and verification operations described herein, application 104 may also be used to access the service 122. In other embodiments, however, authentication application 104 may be a software application operable to perform authentication and verification operations for one or more web services. Further note that, in the depicted embodiment, authentication application 104 is shown executing on the client system 102 being used to attempt to access the service 122. As one non-limiting example, client system 102 may be a laptop computer and authentication application 104 may be software installed thereon that is used by the user during authentication. In other embodiments, however, authentication application 104 may instead be used on a user device (e.g., a mobile device, such as a cellphone, tablet computer, etc.) other than the client system 102. For example, in some embodiments, the user may use a web browser on client system 102 to attempt to access a web service 122. Further, the user may have a mobile device on which the authentication application 104 is installed. In such embodiments, the authentication application 104 on the mobile device may be used to perform the various authentication and verification operations, while the laptop client system 102 may be used to access the service 122.

In FIG. 4A, authentication application 104 includes hash generator 402, which is operable to generate digest value 404 based on an input value, such as encrypted challenge value 140, a current time, a counter, etc. Hash generator 402 may use any suitable hash function, such as SHA-256, MD5, etc., to generate the digest value 404. For example, code snippet 500 of FIG. 5A shows an example implementation in which a digest value 404 is generated using SHA-512 based on a current time value. Note, however, that this embodiment is provided merely as an example and is not intended to limit the scope of the present disclosure. In other embodiments, hash generator 402 may generate digest value 404 based on encrypted challenge value 140 received from server system 120. As noted above, in various embodiments, authentication application 104 is operable to generate a digest value 404 in the same manner that authentication module 121 generates digest value 310 (e.g., using the same function and input value) such that, for a given authentication attempt, the digest values 310 and 404 are the same.

Authentication application 104 further includes signature generation module 406, which is operable to generate partial signature values based on a particular message and one or more private key components. For example, in the embodiment depicted in FIG. 4A, the server private key has been split into three components—a user-selected PIN code, server private key component 118 stored on client system 102, and server private key component 136 stored at the server system 120. In various embodiments, each of these key-components may be used to generate a partial signature value, which may then be combined to generate a final signature value. For example, as discussed above with reference to FIG. 3, authentication module 121 may generate partial signature value 144 using server private key component 136 (e.g., as shown in Equation 1 and code snippet 510 of FIG. 5B). Similarly, in the depicted embodiment, signature generation module 406 may generate partial signature values 146 and 408. In some embodiments, partial signature values 146 and 408 may be generated as follows:

$$PS_{146} = (dv_{404})^{Component\ 118} (\bmod n) \qquad (2)$$

$$PS_{408} = (dv_{404})^{PIN} (\bmod n) \qquad (3)$$

Where $PS_{146}$ is the partial signature value 146, $PS_{408}$ is the partial signature 408, $dv_{404}$ is the digest value 404, and Component 118 is the server private key component 118. Code snippet 520 of FIG. 5C provides one example implementation that may be used to generate partial signature values 146 and 408. Note that, although the server private key has been split into three components in the depicted embodiment, this is provided merely as one non-limiting example. In other embodiments, the server private key may be split into any suitable number of components. In some embodiments, for example, the server private key may be split into two components during the enrollment process, component 118 stored at the client system 102 and component 136 stored at the server system 120. In still other embodiments, the server private key may be split into two components, a PIN code provided by the user during the authentication process and a component 136 stored at the server system 120. In such embodiments, the client system 102 may not store any components of the server private key, for example. Further note that, although the partial signature values may be generated using various techniques, in various embodiments the same technique is used to generate each of the partial signature values. That is, all signature values associated with a given key-pair may be generated in the same manner (e.g., RSA, ElGamal, etc.), using different private key components.

Authentication application 104 further includes signature combination module 410, which is operable to combine partial signature values to generate a final signature value, according to some embodiments. For example, in the depicted embodiment, signature combination module 410 may generate the final signature value 412 based on partial signature values 144, 146, and 408 as follows:

$$SIG_{412} = PS_{144} * PS_{146} (\text{mod } n) * PS_{408} (\text{mod } n) \quad (4)$$

Where $SIG_{412}$ is the final signature value 412. Code snippet 530 of FIG. 5D provides one example implementation that may be used to combine the partial signature values 144, 146, and 408 to determine the final signature value 412. Note that, in various embodiments, signature combination module 410 uses as many partial signature values as there are server private key components when generating the final signature value 412. For example, in the depicted embodiment, the server private key was split into three components during the enrollment process, so signature combination module 410 uses three corresponding partial signature values (e.g., values 144, 146, and 408) to generate the final signature value 412. In embodiments in which the server private key is instead split into only two components, the signature combination module may instead use only two partial signature values to generate the final signature value 412. Substituting Equations 1, 2, and 3 into Equation 4 may then yield:

$$SIG_{412} = (dv_{310})^{Frag.\ 136} (\text{mod } n) * (dv_{404})^{Frag.\ 118} (\text{mod } n) * (dv_{404})^{PIN} (\text{mod } n) \quad (5)$$

Note that, as discussed above, digest values 310 and 404 may be generated in the same manner such that they have the same value for a given iteration, according to various embodiments. Further note that, when the server private key was split into multiple components, the components were selected such that their sum is equal to the entire server private key, as follows:

$$\text{Private Key}_{Server} = PIN + Frag._{136} + Frag._{118} \quad (6)$$

Accordingly, in some embodiments, Equation 5 may be re-written as follows:

$$SIG_{412} = dv^{(PIN+Frag.136+Frag.118)} (\text{mod } n) = dv^{Private\ Key_{Server}} (\text{mod } n) \quad (7)$$

Thus, in various embodiments, the final signature value 412—generated using only components of the server private key and not the complete server private key—is the same signature value that would be obtained using the complete server private key. As no one entity has access to the entire server private key, in various embodiments the disclosed systems and methods are able to protect the server private key from discovery by malicious third-parties.

Authentication application 104 further includes verification value generator 414, which is operable to generate a verification value 416 based on the final signature value 412, according to various embodiments. For example, in the depicted embodiment, verification value generator 414 is operable to generate verification value 416 based on final signature value 412, using server public key 116. In some embodiments, verification value 416 may be generated as follows:

$$\text{Verification Value}_{416} = SIG_{412}^{Server\ Pub.Key116} (\text{mod } n) \quad (8)$$

Code snippet 540 of FIG. 5E provides one example implementation that may be used to generate verification value 416, according to some embodiments. Substituting Equation 7 into Equation 8 may then yield:

$$\text{Verification Value}_{416} = (dv^{Private\ Key_{Server}})^{Public\ Key_{Server}} (\text{mod } n) = dv (\text{mod } n) \quad (9)$$

Thus, in various embodiments, verification value 416 may be a "recovered" version of the digest value 404. The authentication application 104 may compare this verification value 416 to the original digest value 404 (e.g., using comparator 418) to determine whether the authentication challenge originated from the server system 120. If the verification value 416 and the digest value 404 match, authentication application 104 may determine that the authentication challenge—including the partial signature value 144—originated at the server system 120.

FIG. 4B depicts an embodiment in which the authentication application 104 generates an authentication value 148 that may be sent to server system 120 and used to authenticate the user to the service. Note that, in some embodiments, authentication application 104 may generate the authentication value 148 after it has verified that the authentication challenge was sent by the server system 120.

In FIG. 4B, authentication application 104 includes partial decryption module 450, which is operable to generate one or more partially decrypted challenge values based on the encrypted challenge value 140 and one or more client private key components. In the depicted embodiment, for example, partial decryption module 450 uses two components of a client private key, component 112 and the user-provided PIN code, to generate partially decrypted challenge values 456 and 458. As noted herein, the algorithms used to encrypt and decrypt the challenge value 138 may vary, according to different embodiments. As one non-limiting example, in some embodiments, partial decryption module 450 may generate the partially decrypted challenge values 456 and 458 as follows:

$$PDCV_{456} = ECV_{140}^{Component\ 112} (\text{mod } n_c) \quad (10)$$

$$PDCV_{458} = ECV_{140}^{PIN} (\text{mod } n_c) \quad (11)$$

Where $PDCV_{456}$ is the partially decrypted challenge value 456, $PDCV_{458}$ is the partially decrypted challenge value 458, $ECV_{140}$ is the encrypted challenge value 140, Component 112 is the client private key component 112, and $n_c$ is the modulus for the client key-pair.

Authentication application 104 further includes challenge value recovery module 452, which is operable to generate the challenge value 138 based on the partially decrypted challenge values. For example, in the depicted embodiment, challenge value recovery module 452 generates the challenge value 138 based on the partially decrypted challenge values 142, 456, and 458. In some embodiments, challenge value recovery module 452 may recover the challenge value 138 as follows:

$$CV_{138} = PDCV_{142} * PDCV_{456} * PDCV_{458} \quad (12)$$

Where $PDCV_{142}$ is the partially decrypted challenge value 142 and $CV_{138}$ is the challenge value 138. Note that, in various embodiments, when the client private key was split into multiple components, the components were selected such that their sum is equal to the entire client private key, as follows:

$$\text{Private Key}_{client} = PIN + \text{Component } 112 + \text{Component } 130 \quad (13)$$

Accordingly, in some embodiments, Equation 12 may be re-written as follows:

$$CV_{138} = ECV_{140}^{Component\ 130} (\text{mod } n_c) * ECV_{140}^{Componenet\ 112} (\text{mod } n_c) * ECV_{140}^{PIN} (\text{mod } n_c) \quad (14)$$

-continued $$= ECV_{140}^{(Comp.112+Comp.130+PIN)} \pmod{n_c}$$

$$= ECV_{140}^{Private\ Key_{Client}} \pmod{n_c}$$

$$= ((CV_{138})^{Public\ Key_{Client}})^{Private\ Key_{Client}} \pmod{n_c}$$

$$= CV_{138} \pmod{n_c}$$

Thus, in various embodiments, the challenge value recovery module 452 may recover the challenge value 138 using the partially decrypted challenge values 142, 456, and 458. In some embodiments, this recovered challenge value 138 may be sent, to the server system 120, as the authentication value 148 in the authentication response. In other embodiments, however, authentication application 104 may use the recovered challenge value 138 to generate an authentication value 148. For example, in the depicted embodiment, authentication application 104 includes hash generator 454 that is operable to generate authentication value 148 using any suitable hash function, such as SHA-512, etc. Note, however, that this embodiment is provided merely as an example and, in other embodiments, authentication value 148 may be generated based on the recovered challenge value 138 in any other suitable manner. In various embodiments, the client system 102 may send the authentication value 148 (or the recovered challenge value 138) to the server system 120 in an authentication response.

Example Methods

Figure 6A:
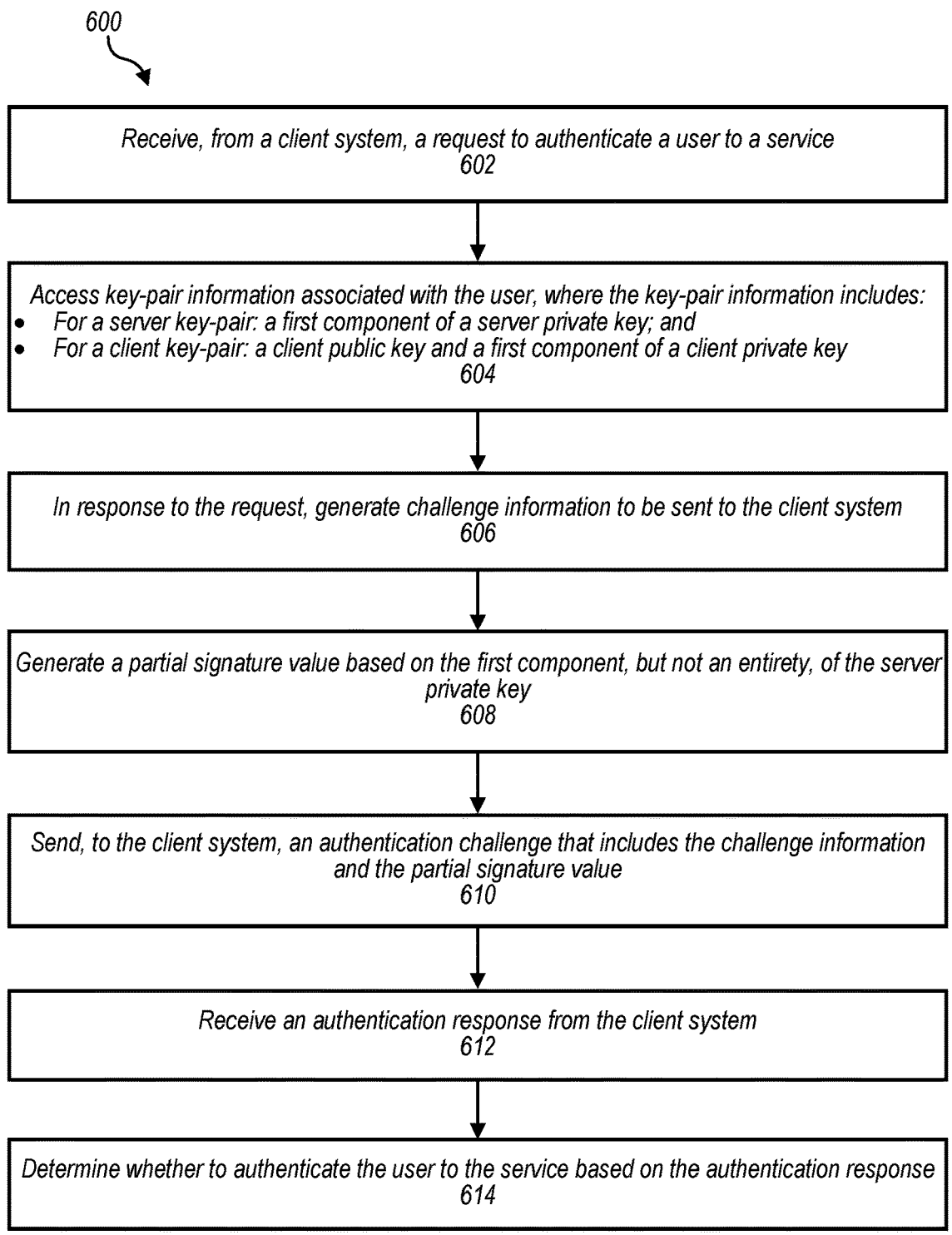
FIG. 6A is a flow diagram illustrating an example method for determining whether to authenticate a user to a service using key-splitting and public key encryption, according to some embodiments.

Referring now to FIG. 6A, a flow diagram illustrating an example method 600 for authenticating a user to a service using key-splitting and public key cryptography, according to some embodiments. In various embodiments, method 600 may be performed by server system 120 of FIG. 1 to determine whether to authenticate a user of client system 102 to the service 122. For example, server system 120 may include (or have access to) a non-transitory, computer-readable medium having program instructions stored thereon that are executable by the server system 120 to cause the operations described with reference to FIG. 6A. In FIG. 6A, method 600 includes elements 602-614. While these elements are shown in a particular order for ease of understanding, other orders may be used. In various embodiments, some of the method elements may be performed concurrently, in a different order than shown, or may be omitted. Additional method elements may also be performed as desired.

At 602, in the illustrated embodiment, the server system receives, from a client system, a request to authenticate a user to a service. In some embodiments, the request specifies credentials (e.g., username and password) for a user account associated with the service. As noted above, the server system and the client system may communicate via either a secured or unsecured network connection. For example, in some embodiments, the server system and client system communicate over a secured network connection using the TLS protocol.

At 604, in the illustrated embodiment, the server system accesses key-pair information associated with the user, where the key-pair information includes, for a server key-pair, a first component of a server private key and, for a client key-pair, includes a client public key and a first component of a client private key. For example, in the embodiment of FIG. 1, the server system 120 may access key information 124, which may include client key-pair information 126 and server key-pair information 132. In various embodiments, the client key-pair information 126 may include the client public key 110 and the client private key component 130, and the server key-pair information 132 may include the server public key 116 and the server private key component 136.

At 606, in the illustrated embodiment, the server system generates challenge information to be sent to the client system in response to the request. As described in more detail above with reference to FIG. 3, in some embodiments, element 606 may include encrypting an original challenge value (e.g., challenge value 138) using the client public key to generate an encrypted challenge value (e.g., encrypted challenge value 140). The server system may then create a partially decrypted challenge value (e.g., using partial decryption module 306) based on the encrypted challenge value and the first component of the client private key. In some embodiments, the server system 120 may include the encrypted challenge value and the partially decrypted challenge value in challenge information that is sent to the client system.

At 608, in the illustrated embodiment, the server system generates a partial signature value based on the first component of the server private key but not an entire server private key. In some embodiments, for example, generating the partial signature value includes generating a digest value based on an initial input value, which may help to prevent and detect tampering in the middle by a third-party. Generating the partial signature value may further include calculating the partial signature value based on the digest value and the first component of the server private key.

At 610, in the illustrated embodiment, the server system sends, to the client system, an authentication challenge that includes the challenge information and the partial signature value. Note that, in various embodiments, the client system includes a second component of the server private key (e.g., server private key component 118) and is operable to generate a final signature value using the second component of the server private key and the partial signature value.

At 612, in the illustrated embodiment, the server system receives an authentication response from the client system. In various embodiments, the authentication response indicates a decrypted challenge value generated, by the client system, based on a second component of the client private key. For example, in some embodiments, the authentication response may include the decrypted challenge value generated by the client system. In other embodiments, however, the authentication response may include an authentication value (e.g., authentication value 148), such as hash value generated based on the decrypted challenge value, which may be considered to be "indicative" of the decrypted challenge value.

At 614, in the illustrated embodiment, the server system determines whether to authenticate the user to the service based on the authentication response. For example, in some embodiments, determining whether to authenticate the user to the service includes comparing the decrypted challenge value to the original challenge value (e.g., using comparator 316 of FIG. 3).

Figure 6B:
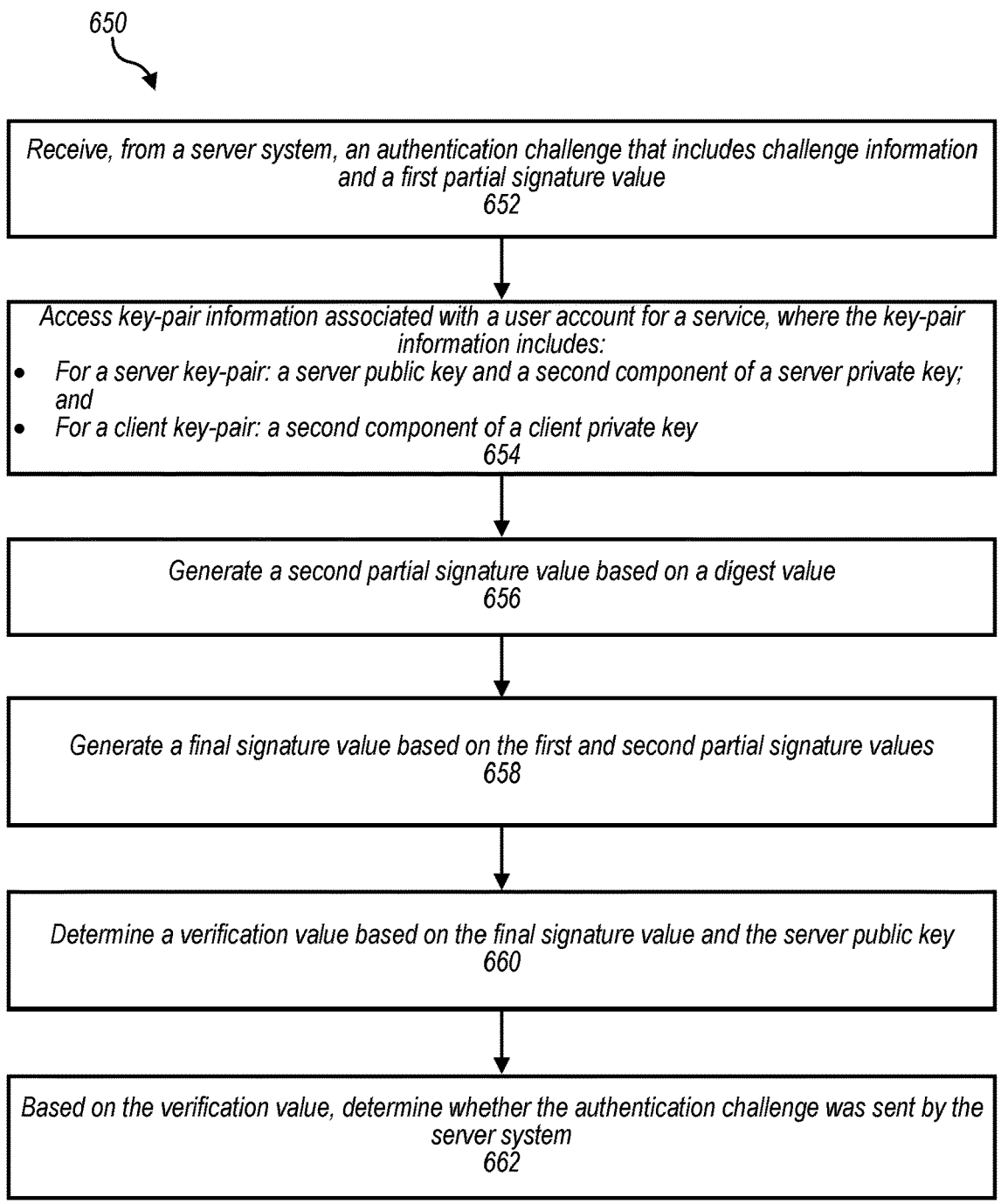
FIG. 6B is a flow diagram illustrating an example method for verifying a message using key-splitting and public key encryption, according to some embodiments.

Turning now to FIG. 6B, a flow diagram illustrates an example method 650 for verifying a message using key-splitting and public key cryptography, according to some embodiments. In various embodiments, method 650 may be performed by client system 102 of FIG. 1 to verify whether a message (e.g., an authentication challenge) was actually sent by the server system 120 that the client 102 is attempting to access. For example, client system 102 may include (or have access to) a non-transitory, computer-readable medium having program instructions stored thereon that are executable by the client system 102 to cause the operations described with reference to FIG. 6B. In FIG. 6B, method 650 includes elements 652-662. While these elements are shown in a particular order for ease of understanding, other orders may be used. In various embodiments, some of the method elements may be performed concurrently, in a different order than shown, or may be omitted. Additional method elements may also be performed as desired.

At 652, in the illustrated embodiment, the client system receives, from a server system, an authentication challenge that includes challenge information and a first partial signature value. In some embodiments, the challenge information includes an encrypted challenge value and a first partially decrypted challenge value.

At 654, in the illustrated embodiment, the client system accesses key-pair information associated with a user account for a service, where the key-pair information includes, for a server key-pair, a server public key and a second component of a server private key, and for a client key-pair, includes a second component of a client key pair. For example, in the embodiment depicted in FIG. 1, client system 102 may access key information 106, which may include client key-pair information 108 and server key-pair information 114. In various embodiments, the client key-pair information 108 may include the client public key 110 and the client private key component 112, and the server key-pair information 114 may include the server public key 116 and the server private key component 118. As discussed herein, the server private key-pair and the client private key-pair may be generated using any of various suitable public key encryption systems. For example, in some embodiments, either (or both) key-pairs may be an RSA asymmetric key-pair, an ElGamal asymmetric key pair, etc. Note that, in some embodiments, both the server and client key-pairs may be based on the same public key encryption scheme while, in other embodiments, the server and client key-pairs may be based on different public key encryption schemes.

At 656, in the illustrated embodiment, the client system generates a second partial signature value based on a digest value. For example, in the embodiment of FIG. 4A, authentication application 104 may generate one or more partial signature values (e.g., partial signature values 146 and 408) based on a digest value 404 and one or more components of a server private key (e.g., a PIN code and the server private key component 118).

At 658, in the illustrated embodiment, the client system generates a final signature value based on the first and second partial signature values. For example, as described above with reference to FIG. 4A, authentication application 104 may include a signature combination module 410 that is operable to combine one or more partial signature values (e.g., values 144, 146, and 408) to generate a final signature value 412.

At 660, in the illustrated embodiment, the client system determines a verification value based on the final signature value and the server public key. At 662, in the illustrated embodiment, the client system determines whether the authentication challenge was sent by the server system based on the verification value. In some embodiments, for example, element 662 includes comparing the verification value (e.g., verification value 416) to the digest value (e.g., digest value 404), and, in response to the verification value matching the digest value, verifying that the authentication challenge was sent by the server system.

In some embodiments, method 650 may further include, in response to a determination that the authentication challenge was sent by the server system 120, decrypting the encrypted challenge value using the second component of the client private key. For example, in some embodiments, decrypting the encrypted challenge value includes using the second component of the client private key to generate a second partially decrypted challenge value based on the encrypted challenge value, and generating a decrypted challenge value based on the first and second partially decrypted challenge values.

Example Computer System

Figure 7:
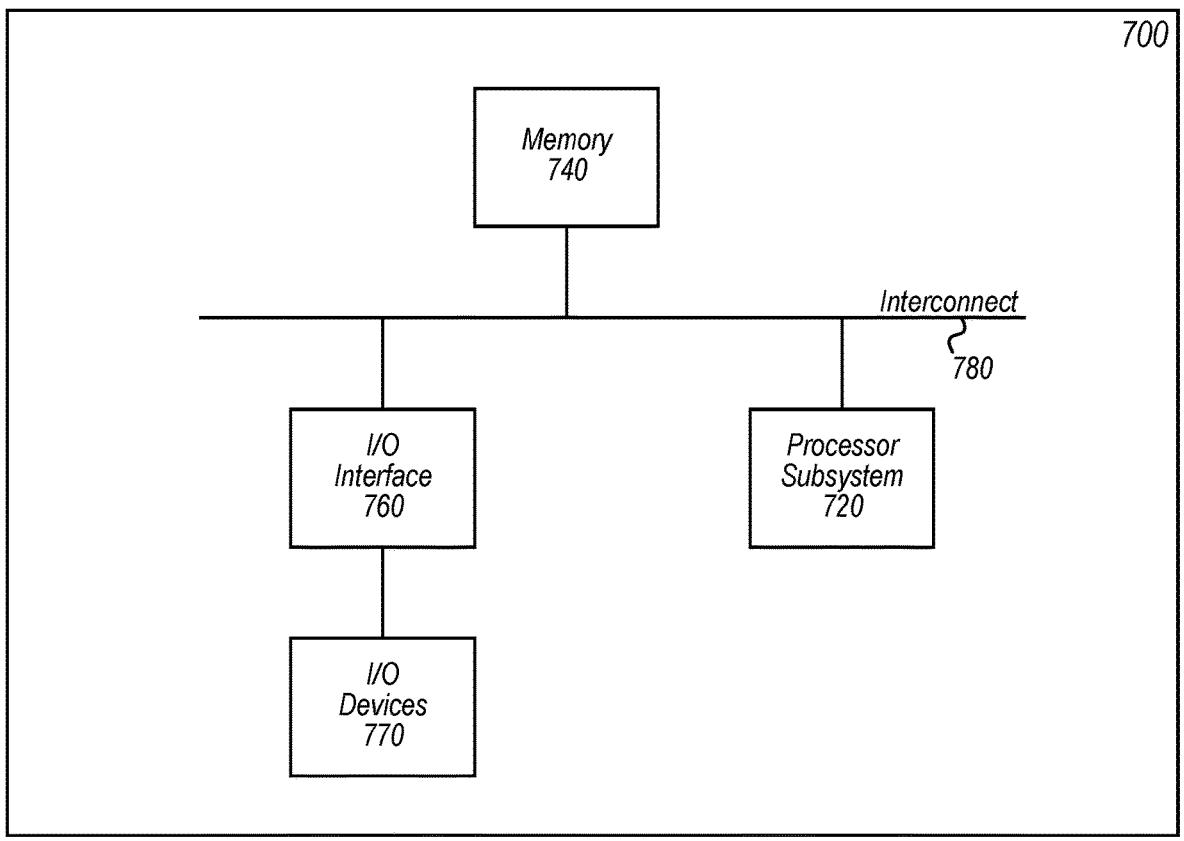
FIG. 7 is a block diagram illustrating an example computer system, according to some embodiments.

Referring now to FIG. 7, a block diagram of an example computer system 700 is depicted, which may implement one or more computer systems, such as client system 102 or server system 120 of FIG. 1, according to various embodiments. Computer system 700 includes a processor subsystem 720 that is coupled to a system memory 740 and I/O interfaces(s) 760 via an interconnect 780 (e.g., a system bus). I/O interface(s) 760 is coupled to one or more I/O devices 770. Computer system 700 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 700 is shown in FIG. 7 for convenience, computer system 700 may also be implemented as two or more computer systems operating together.

Processor subsystem 720 may include one or more processors or processing units. In various embodiments of computer system 700, multiple instances of processor subsystem 720 may be coupled to interconnect 780. In various embodiments, processor subsystem 720 (or each processor unit within 720) may contain a cache or other form of on-board memory.

System memory 740 is usable to store program instructions executable by processor subsystem 720 to cause system 700 perform various operations described herein. System memory 740 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as system memory 740. Rather, computer system 700 may also include other forms of storage such as cache memory in processor subsystem 720 and secondary storage on I/O devices 770 (e.g., a hard drive, storage array, etc.). In some embodiments, these other forms of storage may also store program instructions executable by processor subsystem 720.

I/O interfaces 760 may be any of various types of interfaces configured to couple to and communicate with other devices, according to various embodiments. In one embodiment, I/O interface 760 is a bridge chip (e.g., Southbridge) from a front-side to one or more back-side buses. I/O interfaces 760 may be coupled to one or more I/O devices 770 via one or more corresponding buses or other interfaces. Examples of I/O devices 770 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 770 includes a network interface device (e.g., configured to communicate over WiFi, Bluetooth, Ethernet, etc.), and computer system 700 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., encryption module 304, hash generator 308, comparator 316, etc.). As used herein, the term "module" refers to circuitry configured to perform specified operations or to physical, non-transitory, computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
receiving, by a client system from a server system, an authentication challenge that includes challenge information and a first partial signature value;
accessing, by the client system, key-pair information associated with a user account for a service, wherein the server system has access to a first component of a server private key and a first component of a client private key, wherein the key-pair information includes, for a server key-pair, a server public key and a second component of the server private key, and, for a client key-pair, a second component of the client private key;
using the second component, but not an entirety, of the server private key, generating, by the client system, a second partial signature value based on a digest value;
generating, by the client system, a final signature value based on the first and second partial signature values;
determining, by the client system, a verification value based on the final signature value and the server public key; and
based on the verification value, determining, by the client system, whether the authentication challenge was sent by the server system.

2. The method of claim 1, wherein the determining whether the authentication challenge was sent by the server system includes:
comparing the verification value to the digest value; and
in response to the verification value matching the digest value, verifying that the authentication challenge was sent by the server system.

3. The method of claim 1, further comprising:
generating, by the client system, a third partial signature value based on the digest value, wherein the third partial signature value is generated using a user PIN and not the entirety of the server private key, wherein the final signature value is further based on the third partial signature value.

4. The method of claim 1, wherein the challenge information includes an encrypted challenge value and a first partially decrypted challenge value, wherein the method further comprises:
in response to a determination that the authentication challenge was sent by the server system, decrypting, by the client system, the encrypted challenge value using the second component of the client private key.

5. The method of claim 4, wherein the decrypting the encrypted challenge value includes:
using the second component of the client private key, generating a second partially decrypted challenge value based on the encrypted challenge value; and
generating a decrypted challenge value based on the first and second partially decrypted challenge values.

6. The method of claim 1, wherein the server key-pair is an RSA asymmetric key-pair.

7. The method of claim 1, wherein the client key-pair is an ElGamal asymmetric key pair.

8. A non-transitory, computer-readable medium having instructions stored thereon that are capable of execution by a computing device to perform operations comprising:
receiving, from a server system, an authentication challenge that includes challenge information and a first partial signature value;
accessing key-pair information associated with a user account for a service, wherein the key-pair information includes, for a server key-pair, a server public key and a second component of a server private key, and, for a client key-pair, a second component of a client private key, wherein the server system has access to a first component of the server private key and a first component of the client private key;
using the second component of the server private key but not an entire server private key, generating a second partial signature value based on a digest value;
generating a final signature value based on the first and second partial signature values;
determining a verification value based on the final signature value and the server public key; and
based on the verification value, determining whether the authentication challenge was sent by the server system.

9. The non-transitory, computer-readable medium of claim 8, wherein the determining whether the authentication challenge was sent by the server system includes:
comparing the verification value to the digest value; and
in response to the verification value matching the digest value, verifying that the authentication challenge was sent by the server system.

10. The non-transitory, computer-readable medium of claim 8, wherein the operations further comprise:
generating a third partial signature value based on the digest value, wherein the third partial signature value is generated using a user PIN and not the entire server private key, wherein the final signature value is further based on the third partial signature value.

11. The non-transitory, computer-readable medium of claim 8, wherein the challenge information includes an encrypted challenge value and a first partially decrypted challenge value, wherein the operations further comprise:
in response to a determination that the authentication challenge was sent by the server system, decrypting the encrypted challenge value using the second component of the client private key.

12. The non-transitory, computer-readable medium of claim 11, wherein the decrypting the encrypted challenge value includes:
using the second component of the client private key, generating a second partially decrypted challenge value based on the encrypted challenge value; and
generating a decrypted challenge value based on the first and second partially decrypted challenge values.

13. The non-transitory, computer-readable medium of claim 8, wherein the server key-pair is an RSA asymmetric key-pair.

14. A system, comprising:
at least one processor; and
a non-transitory, computer-readable medium having instructions stored thereon that are capable of execution by the at least one processor to perform operations comprising:

receiving, from a server system, an authentication challenge that includes challenge information and a first partial signature value;

accessing key-pair information associated with a user account for a service, wherein the key-pair information includes, for a server key-pair, a server public key and a second component of a server private key, and, for a client key-pair, a second component of a client private key, wherein the server system has access to a first component of the server private key and a first component of the client private key;

using the second component of the server private key but not an entire server private key, generating a second partial signature value based on a digest value;

generating a final signature value based on the first and second partial signature values;

determining a verification value based on the final signature value and the server public key; and based on the verification value, determining whether the authentication challenge was sent by the server system.

15. The system of claim 14, wherein the determining whether the authentication challenge was sent by the server system includes:

comparing the verification value to the digest value; and in response to the verification value matching the digest value, verifying that the authentication challenge was sent by the server system.

16. The system of claim 14, wherein the operations further comprise:

generating a third partial signature value based on the digest value, wherein the third partial signature value is generated using a user PIN and not the entire server private key, wherein the final signature value is further based on the third partial signature value.

17. The system of claim 14, wherein the challenge information includes an encrypted challenge value and a first partially decrypted challenge value, wherein the operations further comprise:

in response to a determination that the authentication challenge was sent by the server system, decrypting the encrypted challenge value using the second component of the client private key.

18. The system of claim 17, wherein the decrypting the encrypted challenge value includes:

using the second component of the client private key, generating a second partially decrypted challenge value based on the encrypted challenge value; and generating a decrypted challenge value based on the first and second partially decrypted challenge values.

19. The system of claim 14, wherein the server key-pair is an RSA asymmetric key-pair.

20. The system of claim 14, wherein the client key-pair is an ElGamal asymmetric key pair.

* * * * *